(12) United States Patent
Dar et al.

(10) Patent No.: US 11,848,981 B2
(45) Date of Patent: Dec. 19, 2023

(54) SECURE MULTI-DIRECTIONAL DATA PIPELINE FOR DATA DISTRIBUTION SYSTEMS

(71) Applicant: VMware, Inc., Palo Alto, CA (US)

(72) Inventors: Sufian A. Dar, Bothell, WA (US); Tyler J. Curtis, Shingle Springs, CA (US); James W. Cooley, Seattle, WA (US); Mirza Mohsin Beg, Foster City, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/322,817

(22) Filed: May 17, 2021

(65) Prior Publication Data

US 2021/0273990 A1 Sep. 2, 2021

Related U.S. Application Data

(62) Division of application No. 16/047,968, filed on Jul. 27, 2018, now Pat. No. 11,012,500.

(51) Int. Cl.
*H04L 45/00* (2022.01)
*H04L 12/66* (2006.01)
(Continued)

(52) U.S. Cl.
CPC .............. *H04L 67/10* (2013.01); *H04L 45/38* (2013.01); *H04L 67/63* (2022.05); *H04L 12/66* (2013.01)

(58) Field of Classification Search
None
See application file for complete search history.

(56) References Cited

U.S. PATENT DOCUMENTS 6,047,323 A 4/2000 Krause
8,045,557 B1 * 10/2011 Sun ..................... H04W 28/06
455/452.2
(Continued)

FOREIGN PATENT DOCUMENTS

WO WO-03103302 A2 * 12/2003 ......... H04Q 11/0062
WO WO-2009134755 A2 * 11/2009 ............. G06N 5/022
(Continued)

OTHER PUBLICATIONS

Final Office Action received for U.S. Appl. No. 16/047,755, dated Oct. 13, 2020, 42 pages.
(Continued)

*Primary Examiner* — Hitesh Patel
*Assistant Examiner* — Sandarva Khanal
(74) *Attorney, Agent, or Firm* — DLA Piper LLP (US)

(57) ABSTRACT

Techniques for ingesting data streams to a distributed-computing system using a multi-directional data ingestion pipeline are provided. In one embodiment, a method for ingesting data streams includes, at a client gateway, receiving a plurality of messages; assigning the plurality of messages to one or more data streams; obtaining stream routing configurations; and identifying one or more receivers. The method further includes determining whether at least one of the one or more data streams is to be delivered to one or more receivers operating in the first computing environment; and if so, delivering the at least one of the one or more data streams to the one or more receivers operating in the first computing environment. The method further includes delivering the one or more data streams to a data ingress gateway operating in a second computing environment.

11 Claims, 9 Drawing Sheets

(51) Int. Cl.
    *H04L 67/10* (2022.01)
    *H04L 67/63* (2022.01)

(56) References Cited

U.S. PATENT DOCUMENTS

| | | | |
|---|---|---|---|
| 8,817,777 B2 | 8/2014 | Manian et al. | |
| 9,940,284 B1* | 4/2018 | Davis | G06F 13/4221 |
| 10,148,694 B1* | 12/2018 | Sarin | H04L 63/14 |
| 10,417,281 B2* | 9/2019 | Schechter | G06F 16/2452 |
| 10,466,933 B1 | 11/2019 | Bysani Venkata Naga et al. | |
| 11,303,636 B2* | 4/2022 | Back | H04L 63/20 |
| 2002/0111811 A1* | 8/2002 | Bares | G06Q 30/02 |
| | | | 704/275 |
| 2004/0177110 A1* | 9/2004 | Rounthwaite | H04L 51/212 |
| | | | 709/202 |
| 2006/0143459 A1* | 6/2006 | Villaron | G06F 21/6254 |
| | | | 713/176 |
| 2008/0031230 A1 | 2/2008 | Kacher et al. | |
| 2008/0186962 A1* | 8/2008 | Sinha | H04L 12/185 |
| | | | 370/389 |
| 2010/0250767 A1* | 9/2010 | Barreto | H04L 69/16 |
| | | | 709/233 |
| 2011/0060627 A1* | 3/2011 | Piersol | G06Q 30/0202 |
| | | | 705/26.7 |
| 2012/0036262 A1* | 2/2012 | Murphy | H04N 21/43615 |
| | | | 709/225 |
| 2012/0131146 A1* | 5/2012 | Choi | G06F 16/113 |
| | | | 709/219 |
| 2012/0323990 A1 | 12/2012 | Hayworth | |
| 2013/0007183 A1 | 1/2013 | Sorenson et al. | |
| 2013/0039360 A1 | 2/2013 | Manian et al. | |
| 2013/0061046 A1 | 3/2013 | Joy et al. | |
| 2013/0198266 A1 | 8/2013 | Kiley et al. | |
| 2014/0079059 A1* | 3/2014 | Amir | H04L 45/38 |
| | | | 370/390 |
| 2015/0172183 A1* | 6/2015 | DeCusatis | H04L 45/74 |
| | | | 370/392 |
| 2015/0188949 A1 | 7/2015 | Mahaffey et al. | |
| 2015/0281181 A1 | 10/2015 | Albisu | |
| 2015/0319226 A1 | 11/2015 | Mahmood | |
| 2016/0088022 A1 | 3/2016 | Handa et al. | |
| 2016/0100023 A1* | 4/2016 | Kim | H04L 67/56 |
| | | | 709/227 |
| 2016/0142293 A1* | 5/2016 | Hu | H04L 45/38 |
| | | | 370/392 |
| 2016/0164836 A1* | 6/2016 | Roberson | H04L 67/142 |
| | | | 726/1 |
| 2016/0241633 A1 | 8/2016 | Overby et al. | |
| 2016/0344841 A1 | 11/2016 | Wang et al. | |
| 2016/0373445 A1 | 12/2016 | Hayton et al. | |
| 2017/0006006 A1 | 1/2017 | Rawcliffe et al. | |
| 2017/0006030 A1 | 1/2017 | Krishnamoorthy et al. | |
| 2017/0063968 A1 | 3/2017 | Kitchen et al. | |
| 2017/0070398 A1* | 3/2017 | Singhal | G06N 7/01 |
| 2017/0111452 A1 | 4/2017 | Thazhathethil | |
| 2017/0257257 A1 | 9/2017 | Dawes et al. | |
| 2017/0264649 A1 | 9/2017 | Sonar et al. | |
| 2018/0007002 A1 | 1/2018 | Landgraf | |
| 2018/0041437 A1 | 2/2018 | Nishijima et al. | |
| 2018/0081934 A1* | 3/2018 | Byron | H04L 63/10 |
| 2018/0084073 A1 | 3/2018 | Walsh et al. | |
| 2018/0091391 A1 | 3/2018 | Turow et al. | |
| 2018/0091621 A1 | 3/2018 | Kuo et al. | |
| 2018/0167476 A1 | 6/2018 | Hoffner et al. | |
| 2018/0227298 A1* | 8/2018 | Khalil | H04L 63/0876 |
| 2018/0246944 A1 | 8/2018 | Yelisetti et al. | |
| 2019/0132329 A1 | 5/2019 | Verberkt et al. | |
| 2019/0260757 A1* | 8/2019 | Ernesti | H04W 12/63 |
| 2019/0268310 A1* | 8/2019 | Guberman | H04L 9/0819 |
| 2019/0306242 A1 | 10/2019 | Thummalapalli et al. | |
| 2020/0036773 A1 | 1/2020 | Dar et al. | |
| 2020/0036811 A1 | 1/2020 | Dar et al. | |
| 2022/0210245 A1 | 6/2022 | Dar et al. | |

FOREIGN PATENT DOCUMENTS

| | | | | |
|---|---|---|---|---|
| WO | WO-2016016215 A1 | * | 2/2016 | H04L 12/66 |
| WO | WO-2017062544 A1 | * | 4/2017 | A61B 5/1118 |
| WO | WO-2019050508 A1 | * | 3/2019 | G06F 16/784 |

OTHER PUBLICATIONS

Non-Final Office Action received for U.S. Appl. No. 16/047,755, dated Feb. 12, 2021, 38 pages.

Non-Final Office Action received for U.S. Appl. No. 16/047,755, dated Jan. 16, 2020, 33 pages.

Pasquier et al., "CamFlow: Managed Data-Sharing for Cloud Services", IEEE Transactions on Cloud Computing, vol. 5, No. 3, 2015, pp. 472-484.

Rekik et al., "A Comprehensive Framework for Business Process Outsourcing to the Cloud", IEEE International Conference on Services Computing (SCC), 2016, pp. 179-186.

Non-Final Office Action received for U.S. Appl. No. 16/047,968, dated Aug. 19, 2020, 10 pages.

Notice of Allowance received for U.S. Appl. No. 16/047,968, dated Jan. 22, 2021, 8 pages.

Non-Final Office Action received for U.S. Appl. No. 17/510,142, dated Oct. 5, 2022, 51 pages.

* cited by examiner

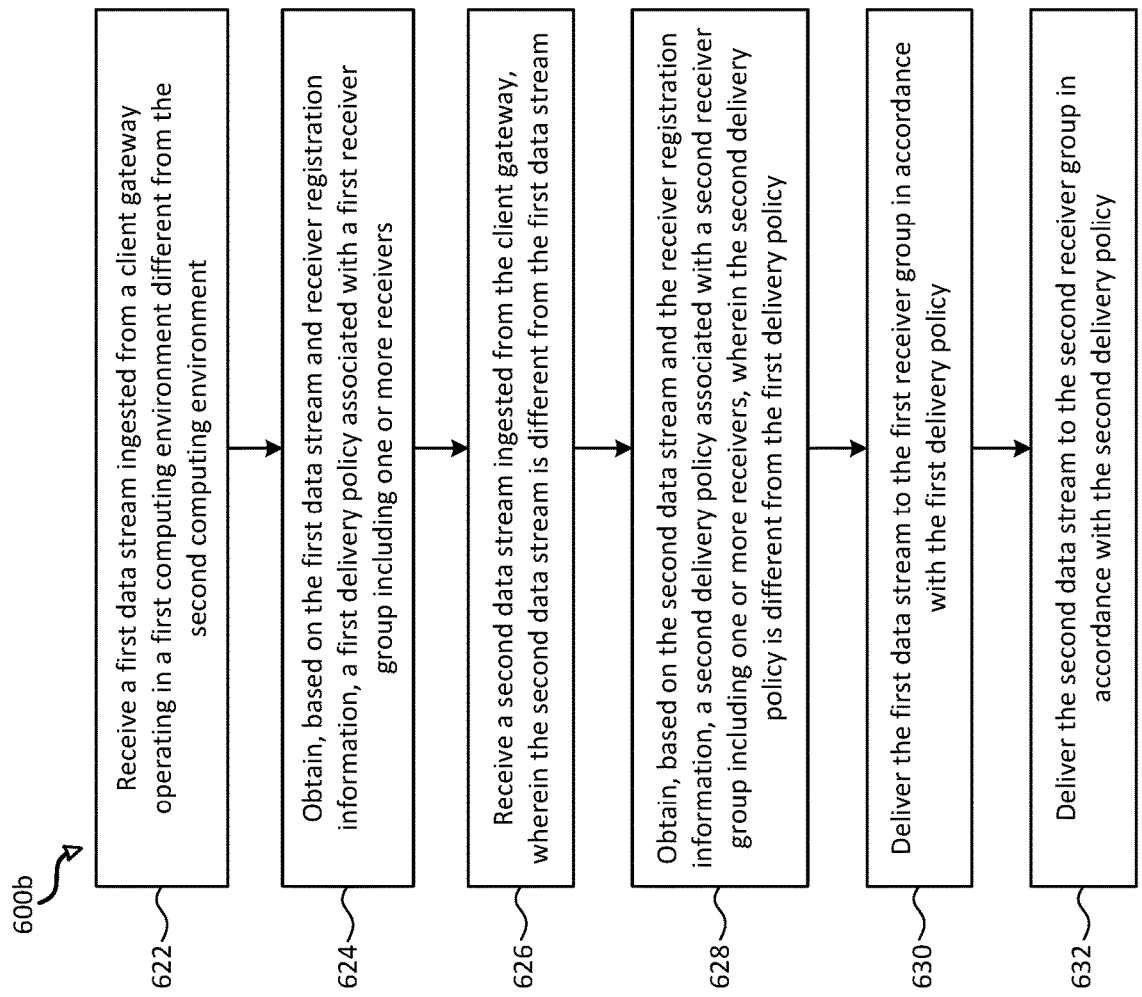

SECURE MULTI-DIRECTIONAL DATA PIPELINE FOR DATA DISTRIBUTION SYSTEMS

CROSS-REFERENCES TO RELATED APPLICATIONS

This application is a Division of U.S. patent application Ser. No. 16/047,968, entitled "SECURE MULTI-DIRECTIONAL DATA PIPELINE FOR DATA DISTRIBUTION SYSTEMS," filed Jul. 27, 2018, and relates to U.S. patent application Ser. No. 16/047,755, entitled "BIDIRECTIONAL COMMAND PROTOCOL VIA A UNIDIRECTIONAL COMMUNICATION CONNECTION FOR RELIABLE DISTRIBUTION OF TASKS," filed on Jul. 27, 2018, the content of which are incorporated by reference for all purposes.

FIELD

The present disclosure relates generally to data distribution pipelines in a distributed-computing system, and more specifically, to ingesting multiple data streams by distributed-computing systems using secure and multi-directional data pipelines.

BACKGROUND

Modern distributed-computing systems are increasingly complex and can include thousands of host computing devices, virtual machines (VMs) and networking components, servicing an even larger number of clients. Systems operating in the clients' private networks produce massive volumes of machine-generated data (e.g., application logs, network traces, configuration files, messages, performance data, system state dumps, etc.). These data provide valuable information to system administrators as they manage these complex systems. These data can be useful in troubleshooting, discovering trends, detecting security problems, and measuring performance.

Data generated from systems operating in a client's private network often need to be distributed in multiple directions to multiple receivers or services. For example, they may need to be delivered to certain data collectors within the client's private network for providing on-premise services. They may also need to be delivered remotely to a cloud-services provider for providing various cloud-based services (e.g., software-as-a-service (SaaS)). As a result, the data often need to be delivered outside of the client's secure and private network infrastructure. Accordingly, there is a need for a secure and multi-directional data pipeline that enables bi-directional communications between the client's private network and a cloud-services provider's network, while also providing the capability of routing data within the client's private network for consumption by on-premise data collectors and services. Moreover, the secure and multi-directional data pipeline may need to deliver data in a substantially real time manner with high-throughput and low latency.

Overview

Described herein are techniques for ingesting data streams to a distributed-computing system using a multi-directional data ingestion pipeline. In one embodiment, a method for ingesting data streams includes, at a client gateway operating in a first computing environment having one or more processors and memory, receiving, from one or more data collectors operating in the first computing environment, a plurality of messages. The method further includes assigning the plurality of messages to one or more data streams; obtaining stream routing configurations; and identifying, based on the streaming routing configurations, one or more receivers. The method further includes determining, based on the identified one or more receivers of the one or more data streams, whether at least one of the one or more data streams is to be delivered to one or more receivers operating in the first computing environment. In accordance with a determination that at least one of the one or more data streams is to be delivered to one or more receivers operating in the first computing environment, the method further includes delivering the at least one of the one or more data streams to the one or more receivers operating in the first computing environment; and delivering the one or more data streams to a data ingress gateway operating in a second computing environment. The one or more data streams are distributed to one or more receivers operating in the second computing environment.

In one embodiment, a non-transitory computer-readable storage medium storing one or more programs configured to be executed by one or more processors is provided. The one or more programs stored by the non-transitory computer-readable storage medium include instructions for receiving, from one or more data collectors operating in the first computing environment, a plurality of messages. The one or more programs include further instructions for assigning the plurality of messages to one or more data streams; obtaining stream routing configurations; and identifying, based on the streaming routing configurations, one or more receivers. The one or more programs include further instructions for determining, based on the identified one or more receivers of the one or more data streams, whether at least one of the one or more data streams is to be delivered to one or more receivers operating in the first computing environment. In accordance with a determination that at least one of the one or more data streams is to be delivered to one or more receivers operating in the first computing environment, the one or more programs include further instructions for delivering the at least one of the one or more data streams to the one or more receivers operating in the first computing environment; and delivering the one or more data streams to a data ingress gateway operating in a second computing environment. The one or more data streams are distributed to one or more receivers operating in the second computing environment.

In one embodiment, a system for ingesting data streams to a distributed-computing system using a multi-directional data ingestion pipeline includes one or more processors and memory storing one or more programs configured to be executed by the one or more processors. The one or more programs include instructions for receiving, from one or more data collectors operating in the first computing environment, a plurality of messages. The one or more programs include further instructions for assigning the plurality of messages to one or more data streams; obtaining stream routing configurations; and identifying, based on the streaming routing configurations, one or more receivers. The one or more programs include further instructions for determining, based on the identified one or more receivers of the one or more data streams, whether at least one of the one or more data streams is to be delivered to one or more receivers operating in the first computing environment. In accordance with a determination that at least one of the one or more data streams is to be delivered to one or more receivers operating in the first computing environment, the one or more programs include further instructions for delivering the at least one of the one or more data streams to the one or more receivers operating in the first computing environment; and delivering the one or more data streams to a data ingress gateway operating in a second computing environment. The one or more data streams are distributed to one or more receivers operating in the second computing environment.

Described also herein are techniques for stream processing of one or more data streams ingested from a client gateway using a multi-directional data ingestion pipeline. In one embodiment, a method includes at a data ingress gateway operating in a second computing environment having one or more processors and memory, receiving a first data stream ingested from a client gateway operating in a first computing environment different from the second computing environment and obtaining, based on the first data stream and receiver registration information, a first delivery policy associated with a first receiver group including one or more receivers. The method further includes receiving a second data stream ingested from the client gateway. The second data stream is different from the first data stream and obtaining. The method further includes obtaining, based on the second data stream and the receiver registration information, a second delivery policy associated with a second receiver group including one or more receivers. The second delivery policy is different from the first delivery policy. The method further includes delivering the first data stream to the first receiver group in accordance with the first delivery policy and delivering the second data stream to the second receiver group in accordance with the second delivery policy.

In one embodiment, a non-transitory computer-readable storage medium storing one or more programs configured to be executed by one or more processors is provided. The one or more programs stored by the non-transitory computer-readable storage medium include instructions for receiving a first data stream ingested from a client gateway operating in a first computing environment different from the second computing environment and obtaining, based on the first data stream and receiver registration information, a first delivery policy associated with a first receiver group including one or more receivers. The one or more programs include further instructions for receiving a second data stream ingested from the client gateway. The second data stream is different from the first data stream. The one or more programs include further instructions for obtaining, based on the second data stream and the receiver registration information, a second delivery policy associated with a second receiver group including one or more receivers. The second delivery policy is different from the first delivery policy. The one or more programs include further instructions for delivering the first data stream to the first receiver group in accordance with the first delivery policy and delivering the second data stream to the second receiver group in accordance with the second delivery policy.

In one embodiment, a system for stream processing of one or more data streams ingested from a client gateway using a multi-directional data ingestion pipeline includes one or more processors and memory storing one or more programs configured to be executed by the one or more processors. The one or more programs stored by the non-transitory computer-readable storage medium include instructions for receiving a first data stream ingested from a client gateway operating in a first computing environment different from the second computing environment and obtaining, based on the first data stream and receiver registration information, a first delivery policy associated with a first receiver group including one or more receivers. The one or more programs include further instructions for receiving a second data stream ingested from the client gateway. The second data stream is different from the first data stream. The one or more programs include further instructions for obtaining, based on the second data stream and the receiver registration information, a second delivery policy associated with a second receiver group including one or more receivers. The second delivery policy is different from the first delivery policy. The one or more programs include further instructions for delivering the first data stream to the first receiver group in accordance with the first delivery policy and delivering the second data stream to the second receiver group in accordance with the second delivery policy.

BRIEF DESCRIPTION OF THE DRAWINGS

FIGS. 6A-6B illustrate flowcharts of exemplary processes for ingesting data streams using multi-directional data ingestion pipeline, in accordance with some embodiments.

DETAILED DESCRIPTION

In the following description of embodiments, reference is made to the accompanying drawings in which are shown by way of illustration specific embodiments that can be practiced. It is to be understood that other embodiments can be used and structural changes can be made without departing from the scope of the various embodiments.

As described above, traditional stream processing pipelines are often rigid and incapable of distributing data streams in multiple directions for consumption by both on-premise and cloud-based services. The techniques described in this application enables (1) collecting data from multiple data sources and platform; (2) on-premise data sharing between the data collectors without the requirements to route through a cloud gateway or server in a cloud-services computing environment; (3) delivering data streams to multiple receivers and services in the cloud-services computing environment; and (4) delivering data streams in a multi-directional manner to receivers and services across multiple computing environments. As a result, data can be distributed flexibly from multiple data sources and platforms to multiple destinations in both the client computing environments (e.g., an on-premise client's private network) and the cloud-services computing environments. Analysis and services can thus be performed in a substantially real-time manner regardless where the analysis and services are performed, either on-premise or in-cloud. The capability of efficiently delivering or routing data stream within the client computing environment and/or to the cloud-services computing environment improves data throughput, reduces latency for data delivery, increases data analysis frequency and data resolution, and therefore enhances overall system operational efficiency.

Moreover, the gateway techniques described in this application facilitate delivering different data streams to different receivers or receiver groups based on different delivery policies. These techniques improve the data delivery efficiency and flexibility because it enables multiple data streams to be multiplexed for delivery while allowing customization of the delivery policies on a per-stream basis. Thus, any single end-to-end data stream delivered from a particular data collector operating in the client computing environment to a particular receiver operating in the cloud-services computing environment can be customized for a particular delivery policy. The routing performance of the data distribution system is thus improved.

Figure 1B:
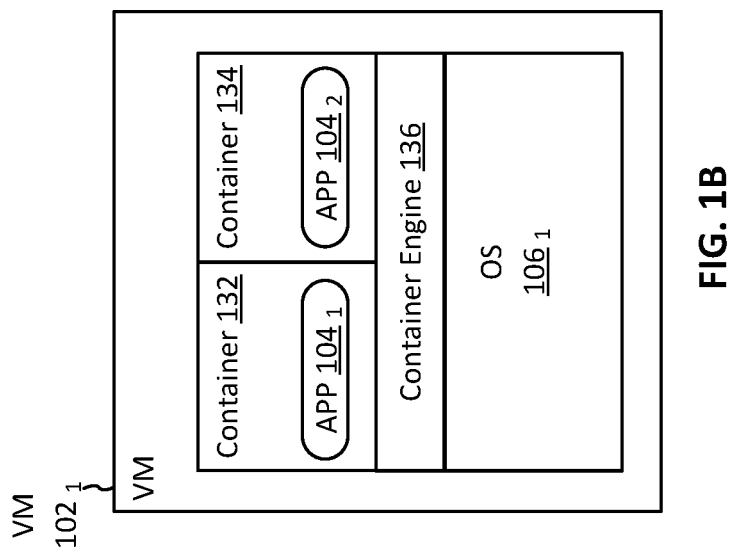
FIG. 1B is a block diagram illustrating a containerized application framework for implementing various components of a distributed-computing system, in accordance with some embodiments.
Figure 1A:
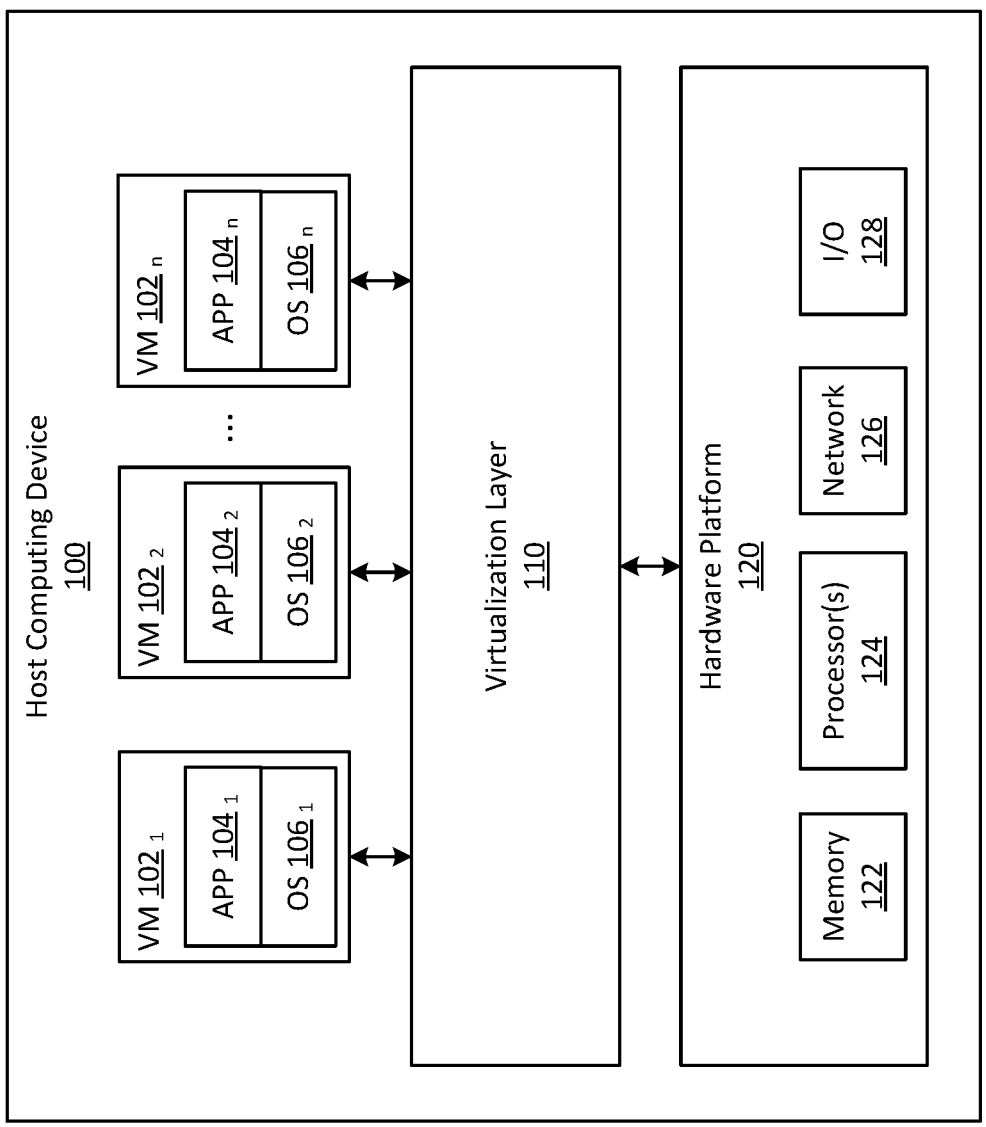
FIG. 1A is a block diagram illustrating a system and environment for implementing various components of a distributed-computing system, in accordance with some embodiments.

FIG. 1A is a block diagram illustrating a system and environment for implementing various components of a distributed-computing system, according to some embodiments. As shown in FIG. 1A, virtual machines (VMs) $102_1$, $102_2$ ... $120_n$ are instantiated on host computing device 100. In some embodiments, host computing device 100 implements one or more elements of a distributed-computing system (e.g., a distributed-computing system operating in a client computing environment and/or a cloud-services computing environment described with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g. a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e. programs containing software code) and the hardware resources used to execute or run applications. However, in this case the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

FIG. 1B is a block diagram illustrating a containerized application framework for implementing various components of a distributed-computing system, in accordance with some embodiments. More specifically, FIG. 1B illustrates VM $102_1$ implementing a containerized application framework. Containerization provides an additional level of abstraction for applications by packaging a runtime environment with each individual application. Container 132 includes App $104_1$ (i.e., application code), as well as all the dependencies, libraries, binaries, and configuration files needed to run App $104_1$. Container engine 136, similar to virtualization layer 110 discussed above, abstracts App $104_1$ from OS $106_1$, while enabling other applications (e.g., App $104_2$) to share operating system resources (e.g., the operating system kernel). As a result of this abstraction, each App 104 runs the same regardless of the environment (e.g., as though it has its own dedicated operating system). In some embodiments, a container (e.g., container 132 or 134) can include a gateway application or process (e.g., a client gateway 332 described with reference to FIG. 3A or a cloud gateway 340 described with reference to FIG. 3B), as well as all the dependencies, libraries, binaries, and configuration files needed to run the gateway applications.

It should be appreciated that applications (Apps) implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
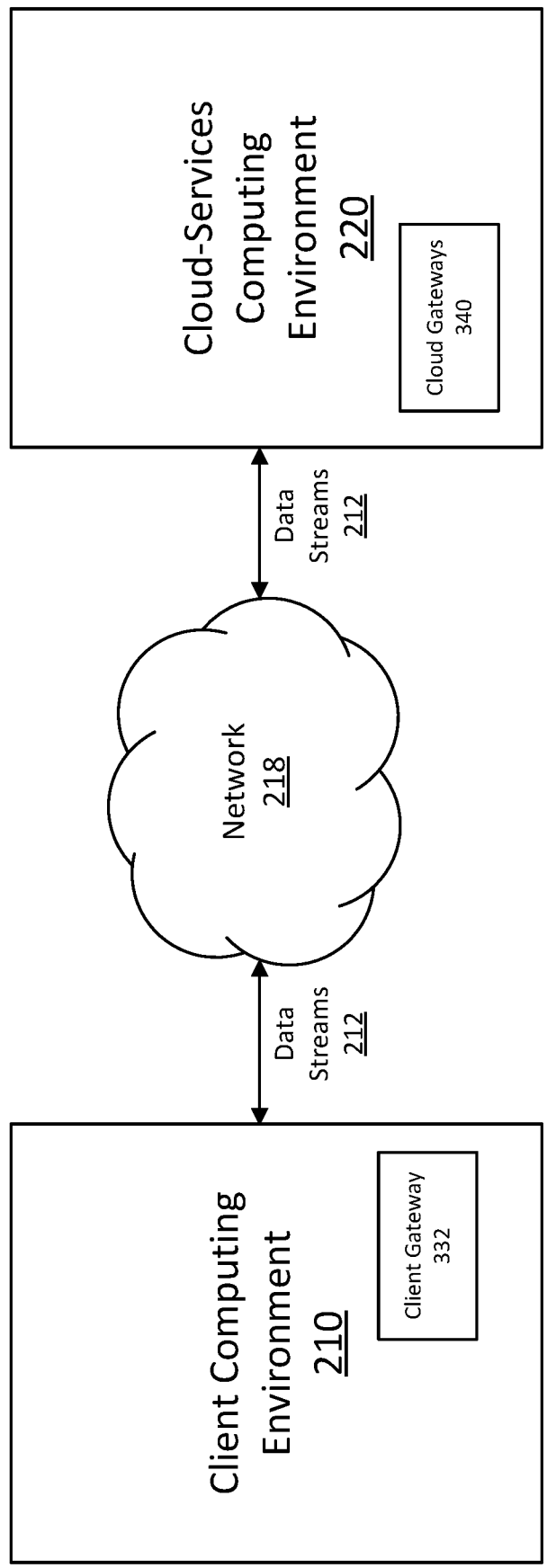
FIG. 2 is a block diagram illustrating systems and environments for establishing a secure and bi-directional connection between a client computing environment and a cloud-services computing environment, in accordance with some embodiments.

FIG. 2 illustrates systems and environments for establishing a secure and bi-directional connection between a client computing environment 210 and a cloud-services computing environment 220, in accordance with some embodiments. As shown in FIG. 2, data can be collected to generate one or more data streams 212 in client computing environment 210. In some embodiments, client computing environment 210 can be a private network operating within an on-premise client's network infrastructure (e.g., client's on-premise network 202 shown in FIG. 3A). An on-premise client's network infrastructure can include networks operating at one or more physical locations of a client (e.g., a company or a business organization) and typically operates behind a firewall. As a result, unauthorized communication with systems operating in client computing environment 210 can be blocked or filtered.

In some embodiments, systems operating in client computing environment 210 can initiate communication with other computing environments (e.g., cloud-services computing environment 220) outside of the on-premise client's network infrastructure. For example, systems operating in client computing environment 210 (e.g., a client gateway 332 described with reference to FIG. 3A) can establish a persistent connection (e.g., HTTP, HTTP/2, TCP, and/or UDP connection) with cloud-services computing environment 220 (e.g., a private/public network operating at the cloud service provider's locations) via network 218 (e.g., a public network such as Internet) to deliver data streams for processing, analyzing, and/or storing by systems operating in cloud-services computing environment 220. Client computing environment 210 and cloud-services computing environment 220 can include two separate networks that do not overlap, and can be separated by a public network (e.g., network 218). While the two computing environments 210 and 220 can be operating in separate networks, data streams and commands can be delivered across network boundaries from one computing environment to another. For example, as described in more detail below, data streams including a plurality of messages collected by data collectors operating in client computing environment 220 can be delivered to cloud-services computing environment 220, while commands for configuring and controlling a client gateway operating in client computing environment 220 can be delivered in the opposite direction.

In some embodiments, for data security, systems operating in client computing environment 210 establishes a connection and initiates communication with cloud-services computing environment 220. Systems operating in cloud-services computing environment 220 may not initiate communication but may respond to requests or data delivery from client computing environment 210 after the communication between two environments is established. In some examples, after a connection (e.g., HTTP, HTTP/2, TCP) is established by systems operating in client computing environment 210, the communication between computing environments 210 and 220 can be bi-directional. For example, data streams can be delivered from client computing environment 210 to cloud-services computing environment 220. Acknowledgements, delivery status responses, and/or commands can be delivered from cloud-services computing environment 220 to client computing environment 210.

In some embodiments, gateways (332 and 340 shown in FIG. 2) in client computing environment 210 and cloud-services computing environment 220 are used to facilitate communications between two environments. Before a client gateway operating in client computing environment 210 (e.g., client gateway 332) is able to deliver data streams to one or more cloud gateways in cloud-services computing environment 220 (e.g., cloud gateways 340), client gateway 332 can be required to be pre-registered with one or more of cloud gateways 340. For example, before communicating with the cloud gateways for the first time, client gateway 332 provides cloud gateways 340 its identifications (e.g., IP addresses, credentials such as user names and passwords), the tenant system(s) it is associated with, the type of agent it is (e.g., a client gateway instead of a service agent), or the like. A tenant system can include or access one or more associated data sources and is described in more details with reference to FIG. 3A. In some embodiments, client gateway 332 can be authenticated by cloud gateways 340 using various key authentication techniques including symmetric or asymmetric authentication cryptography techniques. In some embodiments, secured communications can be established between client gateway 332 operating in client computing environment 210 and cloud gateways 340 operating in cloud-services computing environment 220 based on both client gateway 332's pre-registration and key authentication techniques. In some examples, client gateway 332 operating in client computing environment 210 performs authentication in response to an authentication request from cloud gateways 340 operating in cloud-services computing environment. Next, client gateway 332 operating in client computing environment 210 is described in detail with reference to FIG. 3A; and cloud gateways 340 operating in cloud computing environment 220 is described in detail with reference to FIG. 3B.

Figure 3A:
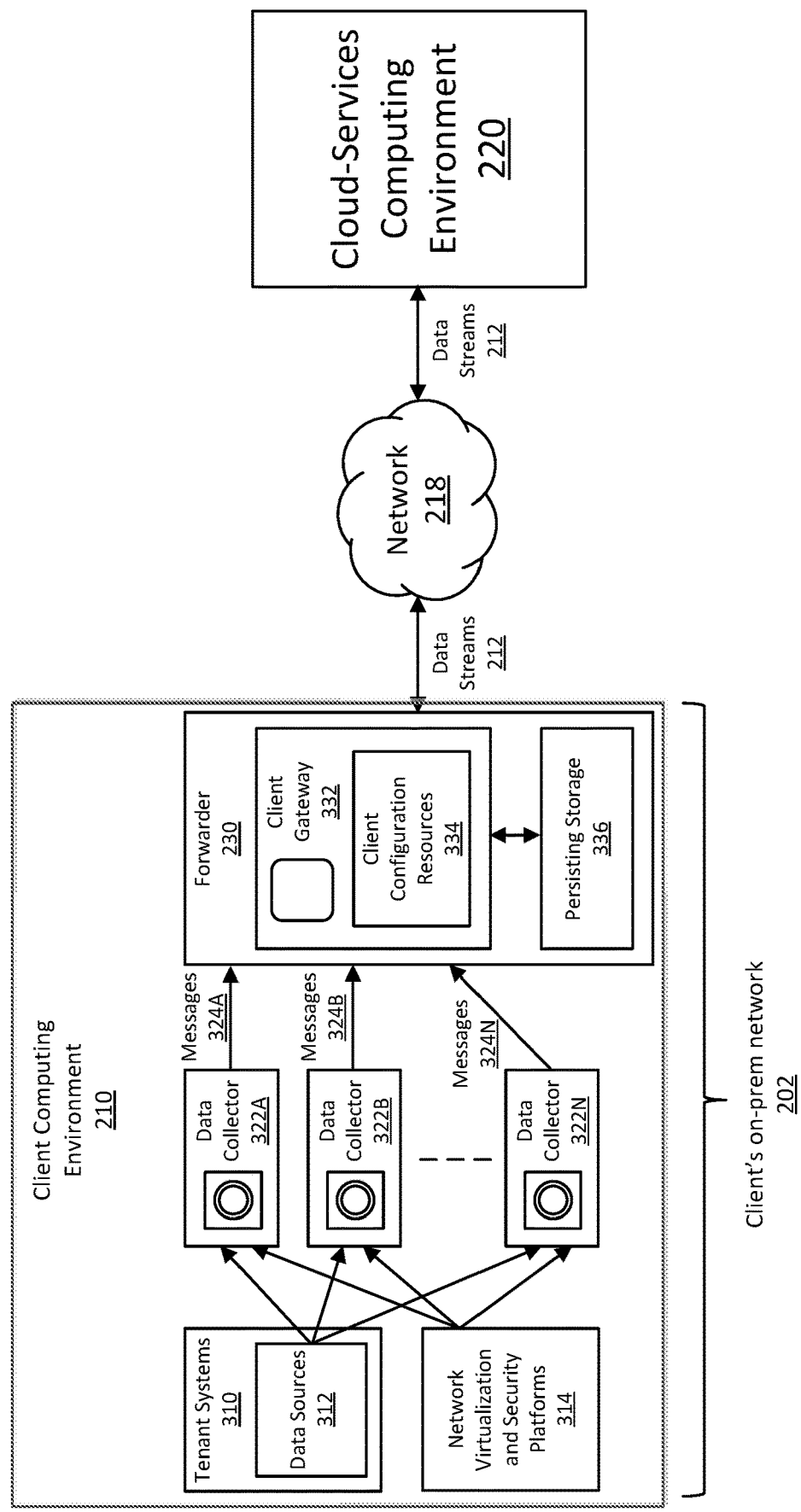
FIG. 3A is a block diagram illustrating systems and environment for collecting and aggregating data collected from multiple data sources and platforms operating in the client computing environment and ingesting data streams to the cloud-services computing environment, in accordance with some embodiments.

FIG. 3A is a block diagram illustrating systems and environment for collecting and aggregating data collected from multiple data sources and platforms operating in client computing environment 210 and ingesting data streams to the cloud-services computing environment 220, in accordance with some embodiments. As shown in FIG. 3A, in some embodiments, client computing environment 210 includes one or more data sources 312 associated with tenant systems 310, one or more network virtualization and security platforms 314, one or more data collectors 322A-N, a forwarder 230, a client gateway 332, client configuration resources 334, and a persisting storage 336. One or more systems of client computing environment 210 can be hardware, software, or a combination thereof. Systems of client computing environment 210 can operate within a client's on-prem network 202.

As illustrated in FIG. 3A, tenant systems 310 can include or have access to one or more associated data sources 312. A tenant system can be a hardware, a software, or a combination thereof operated by or serving a tenant or client. For example, a tenant system can include one or more servers associated with a same tenant. In some embodiments, a tenant system can be provided with the ability to customize at least one aspect of one or more software applications running on the tenant system. For example, a tenant system can be enabled to customize a user interface (e.g., color, appearance, functionality, etc.) of a user terminal for communicating with one or more systems of client computing environment 210 or cloud-services computing environment 220. In some embodiments, one or more data sources 312 can include applications that generate data (e.g., log data), databases that store the generated data, and/or hardware storages. Data sources 312 can be included in tenant systems 310 (e.g., an application running on tenant systems 310) or be an internal/external application/storage that is accessible to tenant system 310. In some embodiments, a tenant system can include, for example, a hypervisor configured to abstract processors, memory, storage and other resources into virtual machines (e.g., VM $102_{1-n}$ as described with reference to FIG. 1), a management plane configured to control data center services and provide access and control to host computing devices (e.g., host computing device 100), a user interface for managing the client computing environment 210, a virtual machine file system, utility tools, storage, etc.

With reference to FIG. 3A, data sources 312 associated with tenant systems 310 can be communicatively coupled to one or more data collectors 322A-N (collectively as data collectors 322). A data collector is a hardware, a software agent, or a combination thereof. Data collectors 322 collect data from the data sources 312, optionally process the collected data, and deliver the data to client gateway 332. The data collected by one or more data collectors 322 can include, for example, a plurality of messages including log messages, application data, inventory information, or the like.

In some embodiments, data collectors 322 can also collect data from network virtualization and security platforms 314. Network virtualization and security platforms 314 abstracts network operations from underlying hardware onto a distributed virtualization layer, similar to server virtualization of processors and operating systems. For example, network virtualization and security platforms 314 provides logic switching, routing, distributed firewalling, load balancing, virtual private networking, application programming interfaces, dynamic security management, log management, and/or other network and security operations. Data generated during these operations may need to be provided for analyzing and optimizing network and security performances, and therefore are provided to one or more data collectors 322, as illustrated in FIG. 3A.

In some embodiments, after one or more data collectors 322 receive data (e.g., messages) from data sources 312 and/or network virtualization and security platforms 314, data collector 322 can forward the data to client gateway 332 with or without further processing the data. As an example, data collectors 322 can forward the received messages to client gateway 332 associated with forwarder 230 without processing. As another example, data collectors 322 include one or more processing pipelines that can process the received messages (e.g., extracting payloads, annotating payloads, categorizing payloads, or the like) and then forward the processed messages to client gateway 332 associated with forwarder 230.

As illustrated in FIG. 3A, client gateway 332 receives messages 324A-N (processed or unprocessed) from one or more of data collectors 322A-N, respectively, and assigns the messages to one or more data streams. A data stream can thus include a group or a sequence of messages with a particular order. In some embodiments, the order of the messages in a data stream can be determined based on the order the messages are received at client gateway 332. In some embodiments, the order of the messages in a data stream can be determined based on predetermined configurations such as priority configurations (e.g., a higher priority may be given to messages collected by a particular data source).

In some embodiments, messages 324A-N include information (e.g., a data field) identifying which data collectors collected, processed, and/or forwarded the messages. For example, a particular message forwarded by data collector 324A can include a data field (e.g., a header) that indicates the particular message is collected, processed, and/or forwarded by data collector 322A. In some embodiments, to assign a particular message to a data stream, client gateway 332 obtains the information included in the message that identifies the collector that collected, processed, and/or forwarded the particular message to client gateway 332. Based on the identification of the data collector associated with the particular message, client gateway 332 identifies a particular data stream associated with the particular data collector that collected, processed, and/or forwarded the particular message. In some embodiments, client gateway 332 performs this identification using predetermined collector-stream association stored in, for example, client configuration resources 334. For example, a particular data stream may be assigned a stream name or ID and associated with a particular data collector. All messages collected by the particular data collector can be assigned to the corresponding data stream. In some embodiments, assigning a particular message to a particular corresponding data stream can include associating a tag to the particular message, wherein the tag uniquely identifies the particular data stream. As a result, all messages that belong to the same data stream are associated with a same tag.

In some embodiments, a data stream is further associated with and/or identified by the receivers/subscribers of the stream and/or the type of delivery policy to be used for delivering the data stream (e.g., asynchronous or synchronous delivery). The association of data streams with receivers/subscribers and delivery policies is described below in more detail with reference to FIG. 3B.

In some embodiments, the data streams generated by client gateway 332 (e.g., based on assigning messages to data streams) can be further processed before they are delivered to one or more receivers operating in client computing environment 210 and/or cloud-services computing environment 220. As illustrated in FIG. 3A, forwarder 230 can perform one or more of redacting, filtering, transforming, or obfuscating of the messages in a particular data stream before delivering the data stream to its receivers. For example, forwarder 230 can redact a message by suppressing, blocking, or removing sensitive data such as personal identifiable information included in the message. Forwarder 230 can also filter the plurality of messages in a data stream by suppressing, blocking, or removing messages that are not appropriate or required to be transmitted out of client computing environment 210 (e.g., confidential, sensitive, inappropriate content, etc., that are not appropriate to be transmitted out of the client's private network). Forwarder 230 can also change the format or otherwise transform the messages in a particular data stream to another form (e.g., different file format, content transformation, etc.). Forwarder 230 can also obfuscate messages by masking or obscuring them to enhance security. For example, a sensitive IP address may be replaced with 0.0.0.0 such that the source of the IP address cannot be identified.

Figure 4:
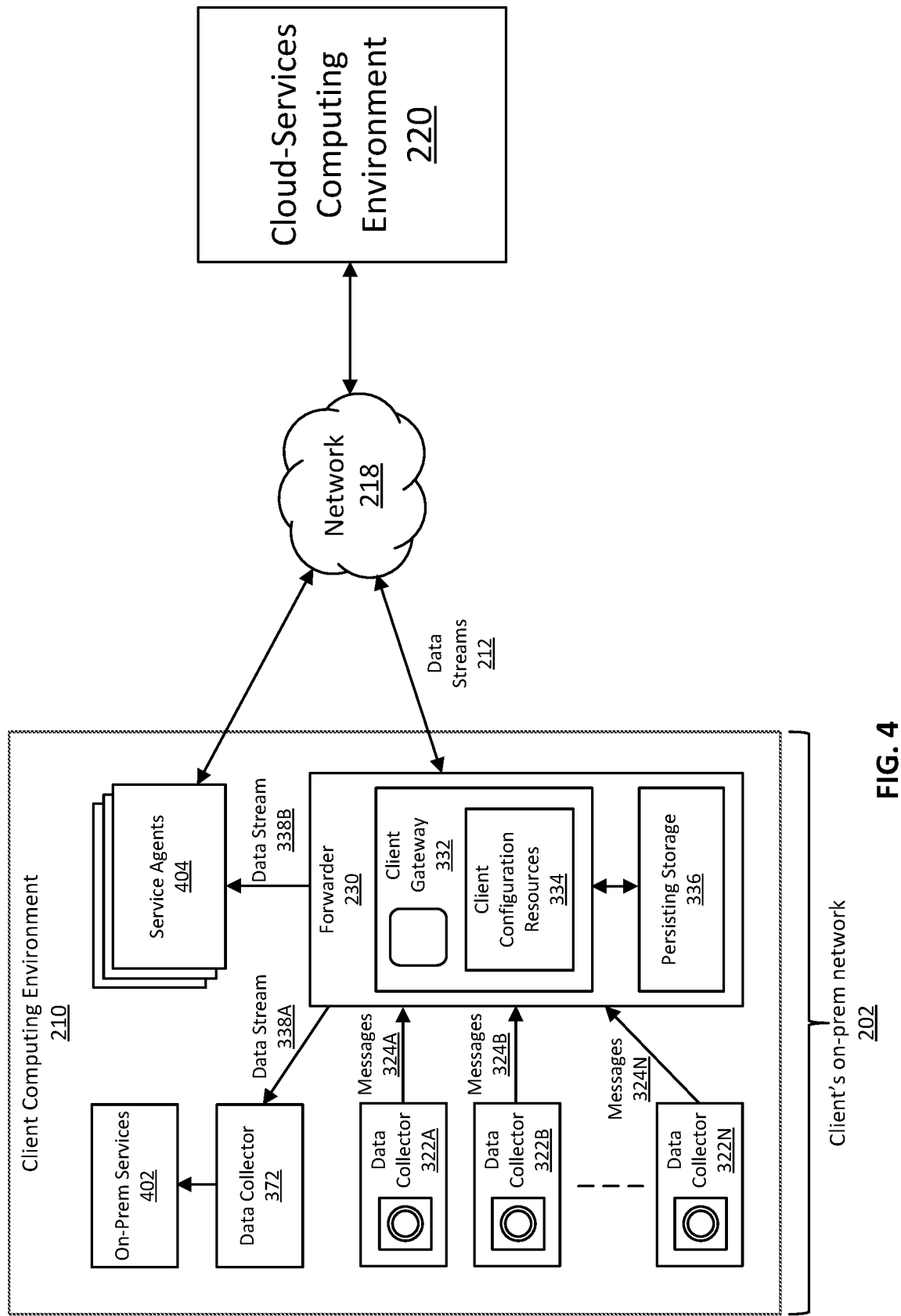
FIG. 4 is a block diagram illustrating systems and environment for distributing data streams to multiple receivers and service agents operating in the client computing environment, in accordance with some embodiments.

In some embodiments, after client gateway 332 assigns messages received from data collectors 322A-N to one or more data streams, and the messages are optionally further processed, client gateway 332 obtains stream routing configurations for routing or delivering the data streams to their destinations. In some embodiments, client gateway 332 is configured such that a particular data stream can be delivered not only to remote destinations within cloud-services computing environment 220 for performing cloud-based services (e.g., SaaS services), but also to on-premise destinations within client computing environment 210 for performing on-premise data analysis and services. FIG. 4 illustrates systems and environment for distributing data streams to multiple receivers and service agents operating in client computing environment 210 and to remote destinations in cloud-services environment 220 via network 218.

As illustrated in FIG. 4, client gateway 332 can obtain stream routing configurations (e.g., a routing table) stored in client configuration resources 334. The stream routing configurations include information that indicates destinations of a particular data stream. The destinations can include on-premise designations and/or remote cloud destinations. On-premise destinations can include one or more receivers of the particular data stream, including, for example, one or more data collectors and/or one or more service agents operating in client computing environment 210. The remote cloud destinations can include one or more receivers operating in cloud-services computing environment 220. The cloud gateways are described in more detail with reference to FIG. 3B below.

With reference to FIG. 4, based on the obtained stream routing configurations, client gateway 332 identifies one or more receivers. For example, based on a routing table included in the stream routing configurations, client gateway 332 identifies a receiver of a data stream 338A as being a data collector 372 operating in client computing environment 210 (e.g., an on-premise data collector); identifies that a receiver of data stream 338B as being one or more service agents 404 operating in client computing environment 210 (e.g., an on-premise service agent); and identifies receivers of data stream 212 as being remote receivers operating in cloud-services computing environment 220 as shown in FIG. 3A.

In some embodiments, based on the identified one or more receivers, client gateway 332 determines whether one or more data streams are to be delivered to one or more receivers operating in the client computing environment 210. If so, client gateway 332 delivers the one or more data streams to the receivers operating in client computing environment 210. For example, based on the identification of data collector 372 as being an on-premise receiver, client gateway 332 delivers data stream 338A to data collector 372, which may in turn provide data stream 338A to on-premise services 402 for performing on-premise analysis and services (e.g., issue analysis, monitoring, alerting, provisioning, optimization, or the like) using the messages included in data stream 338A. Client gateway 332 thus enables on-premise or local data sharing between the data collectors without the requirements to route through a cloud gateway or server. As a result, the analysis and services can be performed on-premise in a substantially real time manner. The capability of efficiently delivering or routing data stream within client computing environment 210 improves data throughput, reduces latency for data delivery, increases data analysis frequency and data resolution, and enhances overall system operation efficiency.

With reference to FIG. 4, in some embodiments, based on the identification of service agents 404 as being on-premise receivers, client gateway 332 delivers data stream 338B to service agents 404, which may in turn deliver data stream 338B to one or more cloud computing services (e.g., services operating in cloud-services computing environment 220 or other cloud-based services). Service agents 404 can be, for example, agents that are authorized to deliver data streams to, and receive commands from, different cloud computing services (e.g., third-party cloud services) that performs analysis and services (e.g., SaaS services) using the messages included in the data streams. In some examples, for data security, the service agents are required to be registered with and/or authorized by client gateway 332 before they can receive data streams from client gateway 332. While the above description uses data collectors and service agents as examples of on-premise receivers, it is appreciated that an on-premise receiver can also be other type of receivers, e.g., a publish-subscribe type receiver similar to the one described below with reference to FIG. 5B.

In some embodiments, in addition to delivering the one or more data streams to receivers operating in client computing environment 210, client gateway 332 can also deliver the data streams to a cloud gateway (e.g., a data ingress gateway) operating in a cloud-services computing environment 220. As an example and with reference to FIG. 4, data streams 338A and 338B can be replicate of corresponding data streams included in data streams 212, which are delivered to receivers operating in cloud-services computing environment 220. Thus, client gateway 332 delivers data streams 338A and 338B not only to the on-premise receivers (e.g., data collector 372 and service agents 404) but also to remote receivers (e.g., cloud gateways operating in a cloud-services computing environment). As a result, using client gateway 332, a particular data stream can be distributed to multiple destinations, whether on-premise or in cloud, in a substantially real time manner with low data latency. Client gateway 332 thus improves data throughput and reduces latency in delivering data. Further, client gateway 332 is thus also capable of delivering data streams to multiple cloud computing services across different cloud-services computing environments (e.g., delivering data streams to various public and private cloud services providers). As described in more detail below with reference to FIG. 3B, cloud gateways operating in cloud-services computing environments can subsequently distribute the data streams to one or more receivers operating in the cloud-services computing environments.

With reference to FIG. 4, in some embodiments, client gateway 332 can store (e.g., persist or cache) replicates of some or all messages of one or more data streams (e.g., data streams 212, 338A and 338B) in persisting storage 336 (e.g., a cache, disk, or other types of storage). Storing replicates of messages enables a more robust communication between client gateway 332 and data stream destinations. For example, if a receiver of a particular data stream is unavailable or if a connection between client computing environment 210 and a cloud-services computing environment 220 is interrupted, replicates of the messages can be used to re-send the data to the receivers. As a result, data loss can be reduced or eliminated. In some embodiments, based on predetermined policies or rules stored in, for example, client configuration resources 334, client gateway 332 can store (e.g., persist or cache) replicates of some or all messages of one or more data streams for a predetermine period of time, and then delete the messages (or otherwise make them unavailable/inaccessible) after the predetermined period of time expires. Storing the messages for a predetermined period of time (rather than permanently or an excessive period of time) enables a more efficient and disk-space saving operation by client gateway 332.

Figure 3B:
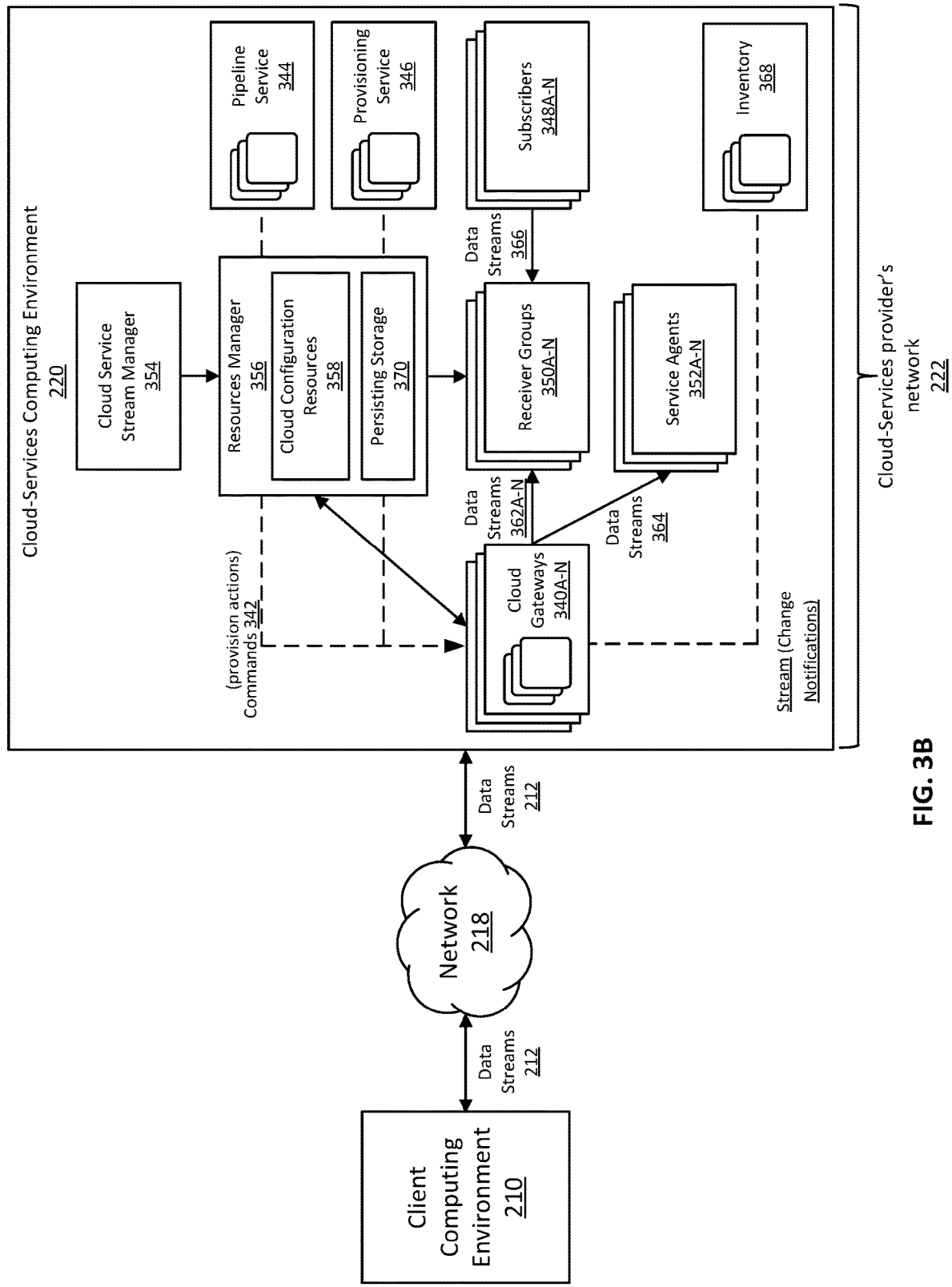
FIG. 3B is a block diagram illustrating systems and environment for distributing data streams to multiple receivers, agents, and services operating in the cloud-services computing environment, in accordance with some embodiments.

With reference back to FIG. 3B, as described above, a client gateway operating in client computing environment 210 ingests data streams 212 to cloud-services computing environment 220 using a bi-directional data pipeline via network 218 (e.g., Internet). As illustrated in FIG. 3B, cloud-services computing environment 220 can include one or more cloud gateways 340A-N, a cloud service stream manager 354, a resources manager 356, one or more receiver groups 350A-N (collectively as groups 350), one or more service agents 352A-N (collectively as 352), one or more cloud computing services (e.g., pipeline service 344, provisioning service 346, inventory 368), and one or more data stream subscribers 348A-N (collectively as subscribers 348). One or more systems or components of cloud-services computing environment 220 can be hardware, software, or a combination thereof. As described above, cloud-services computing environment 220 can include a cloud-services provider's network 222, which may be a private or public network.

As illustrated in FIG. 3B, one or more cloud gateways 340A-N (collectively as cloud gateways 340) receive data streams 212. A cloud gateway can be a data ingress gateway that distributes multiple data streams to multiple destinations. As described above, data streams 212 may include multiple data streams that are associated with respective data collectors. For example, data streams 212 may include data streams 362A-N. Messages included in data streams 362A-N are collected by different data collectors operating in client computing environment 210. Different data collectors may collect messages from different data sources or platforms. Thus, data streams 362A-N may include messages collected from different data sources or platforms. As a result, data streams 362A-N may need to be delivered to different receivers or receiver groups (e.g., receiver groups 350A-N). A receiver can be a uniform resource identifier (URI), a port, or a protocol for message delivery. A receiver group includes one or more receivers for receiving the same data stream. As described in more detail below with reference to FIGS. 5A-5B, different receivers in a same receiver group may be configured to store different topics of a particular data stream; and different receiver groups may be associated with different delivery policies.

In some embodiments, one or more messages in a data stream can include path fields indicating the destination of the data stream. The destination can be, for example, one or more receivers in a receiver group (e.g., receiver groups 350A-N) or one or more service agents (e.g., service agents 352A-N). As one example, a path field of a message in a particular stream includes a stream identification. A particular receiver or multiple receivers in a receiver group can be pre-registered with cloud gateways 340 to be a receiver or receivers for receiving data streams with a particular stream identification. The receiver registration information can be represented or included in, for example, a routing table. As a result, the stream identification included in the path field of a message and the receiver registration information can be used by cloud gateways 340 to identify the particular receiver or receivers in a receiver group for receiving the particular data stream. Similarly, using destination information and a routing table, cloud gateways 340 can also identify one or more service agents 352A-N for receiving particular data streams. In some examples, the routing table, which can include the receiver registration information, is stored in cloud configuration resources 358 accessible by cloud gateways 340.

Figure 5A:
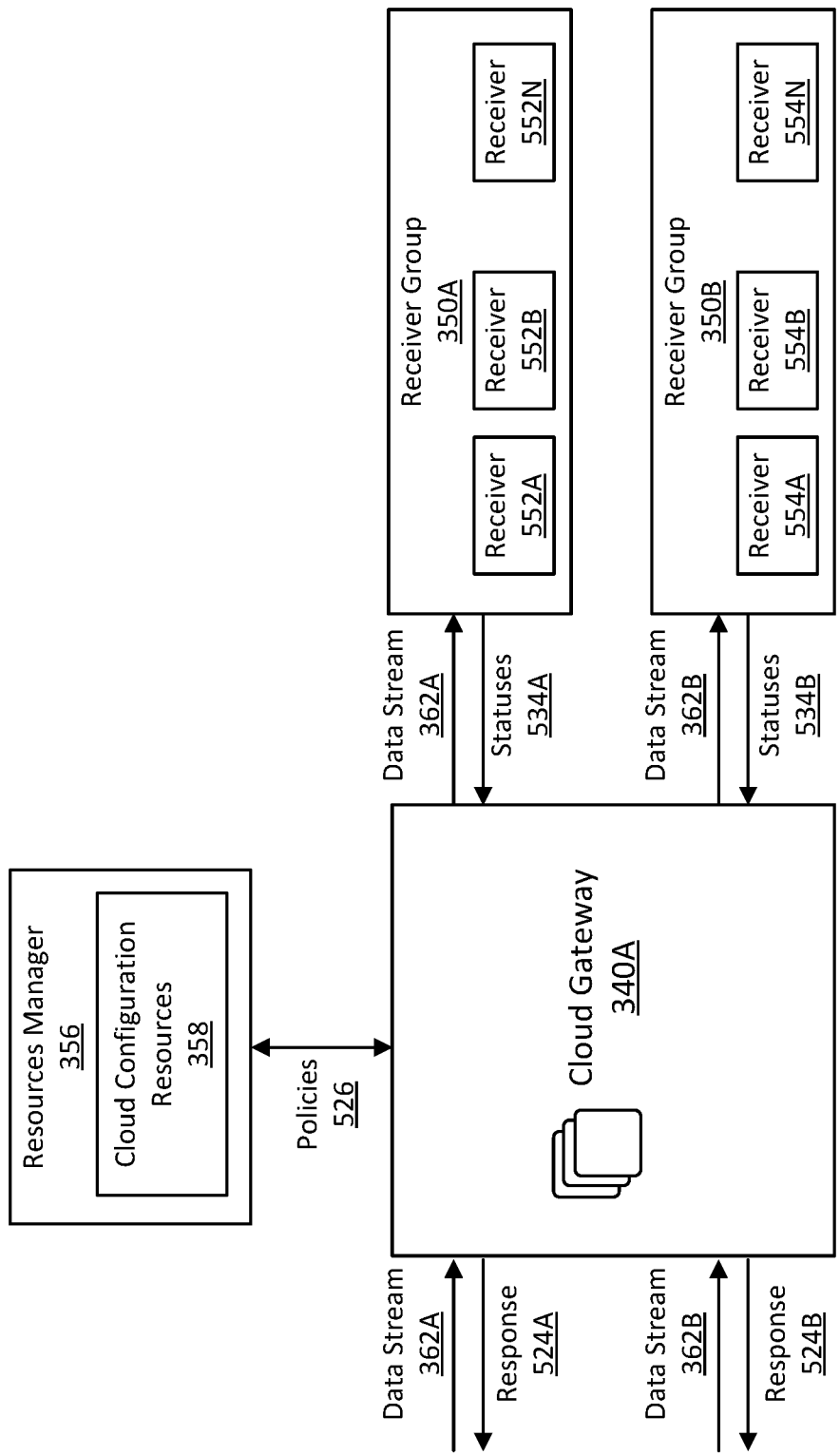
FIG. 5A is a block diagram illustrating systems and environment for distributing multiple data streams to different receiver groups according to different delivery policies, in accordance with some embodiments.

In some embodiments, a receiver group including one or more receivers can be associated with a data stream delivery policy. Different receiver groups can have different delivery policies. FIG. 5A is a block diagram illustrating systems and environment for distributing two different data streams 362A and 362B to different receiver groups 350A and 350B, respectively, according to different delivery policies. Data stream delivery policies can include, for example, a wait-for-all policy, a wait-for-any policy, and a wait-for-none policy. In accordance with a wait-for-all policy, a cloud gateway waits for all receivers in a particular receiver group or groups to respond to the cloud gateway with OK statuses (e.g., an HTTP 200 OK status) before the cloud gateway responds to the client gateway with an OK status. In accordance with a wait-for-any policy, a cloud gateway waits for the first receiver in a particular receiver group or groups to respond to the cloud gateway with an OK status (or any receiver to respond with a 4xx error code indicating a client error) before the cloud gateway responds to the client gateway with an OK status. In accordance with a wait-for-none policy, the cloud gateway responds to the client gateway with an OK status without waiting for a receiver in a particular receiver group or groups to respond with OK statuses to the cloud gateway.

As described above, in some examples, different receiver groups can have different data stream delivery policies. A cloud gateway can obtain the delivery policy associated with a particular data stream. As illustrated in FIG. 5A, for example, cloud gateway 340A receives two data streams, i.e., a data stream 362A and data stream 362B (e.g., as part of data streams 212 shown in FIG. 3B). Based on messages included in data streams 362A and 362B, cloud gateway 340A identifies destination information included in the messages. The destination information can include stream identifications. Based on the destination information and a routing table (e.g., including receiver registration information stored in cloud configuration resources 358 of resource manager 356), cloud gateway 340A identifies receiver group 350A as a destination of data stream 362A and receiver group 350B as a destination of data stream 362B.

In some embodiments, different data stream delivery policies (e.g., policies 526) can be associated with receiver group 350A and receiver group 350B. For example, a wait-for-all policy may be associated with receiver group 350A and a wait-for-one policy may be associated with receiver group 350B. With reference to FIG. 5A, cloud gateway 340A obtains the delivery policies associated with receiver groups 350A and 350B from cloud configuration resources 358 and deliver data streams 362A and 362B to receiver groups 350A and 350B, respectively, in accordance with the respectively associated delivery policies. For example, if receiver group 350A is associated with a wait-for-all policy, cloud gateway 340A can deliver data stream 362A to receivers 552A-N included in receiver group 350A (e.g., routing data stream 362A to receivers 552A-N based on a routing table and destination information included in messages of data stream 362A), wait for all receivers 552A-N to respond with OK statuses 534A, and then provides a response 524A to the client gateway (e.g., client gateway 332 shown in FIG. 3A) with an OK status. Similarly, if receiver group 350B is associated with a wait-for-one policy, cloud gateway 340A can deliver data stream 362B to receivers 554A-N included in receiver group 350B (e.g., routing data stream 362B to receivers 554A-N based on a routing table and destination information included in messages of data stream 362A), wait for a first receiver of receivers 554A-N to respond with OK statuses 534B (or wait for any receiver to respond with a 4xx error code indicating client error), and then provide a response 524B to the client gateway (e.g., client gateway 332 shown in FIG. 3A) with an OK status.

As illustrated in FIG. 5A and described above, cloud gateway 340A can deliver different data streams to different receiver groups based on different delivery policies. This capability of cloud gateway 340A can improve the data delivery efficiency and flexibility because it enables multiple data streams to be multiplexed for delivery while allowing customization of the delivery policies on a per-stream basis. Thus, any single end-to-end data stream delivered from a particular data collector operating in the client computing environment to a particular receiver operating in the cloud-services computing environment can be customized for a particular delivery policy. The routing performance of the cloud gateway is thus improved.

Figure 5B:
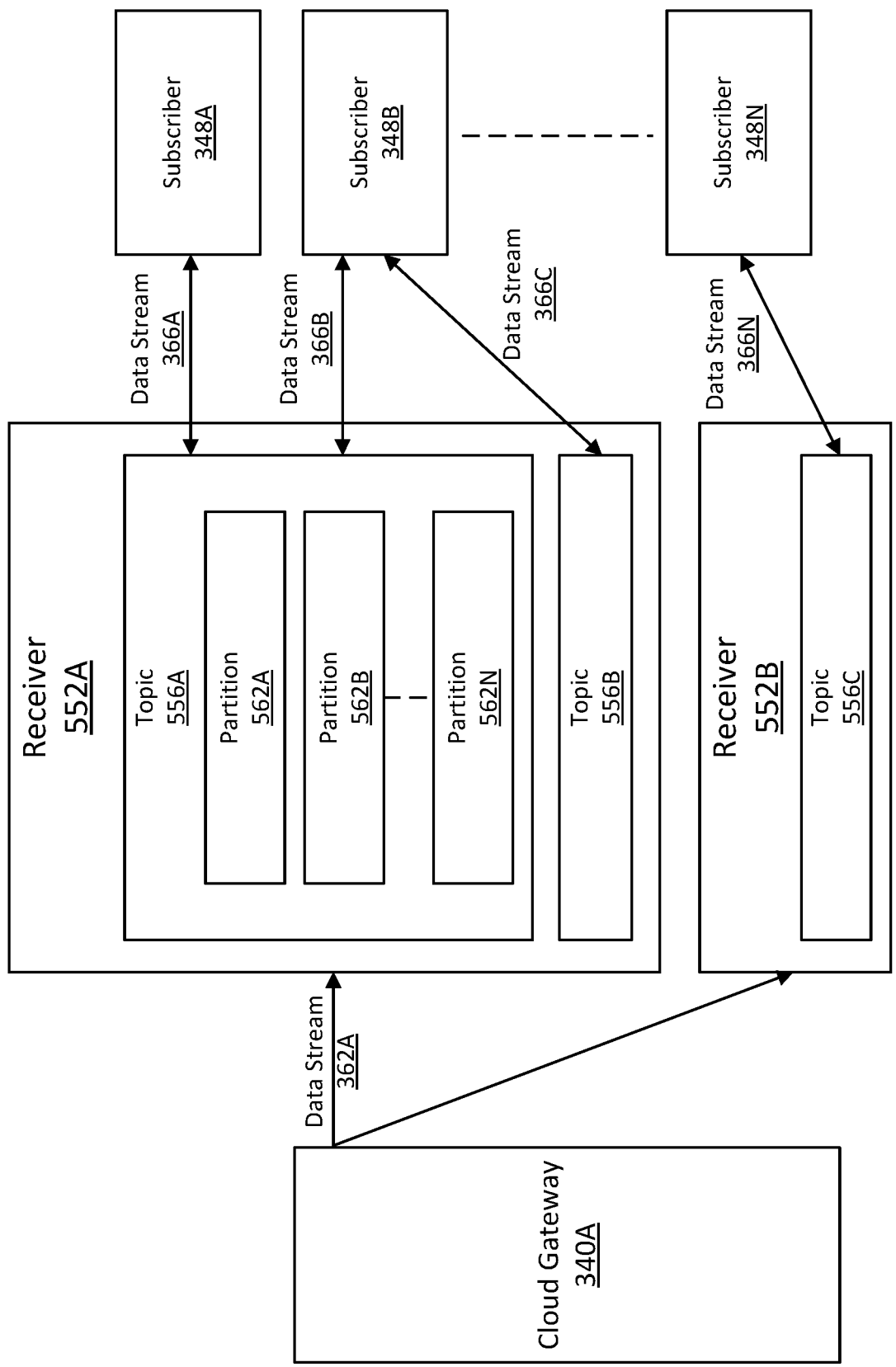
FIG. 5B is a block diagram illustrating systems and environment for providing data from receivers to multiple subscribers, in accordance with some embodiments.

With reference to FIG. 5B, in some embodiments, a receiver can be a publish-subscribe type receiver operating on one or more servers. A publish-subscribe type receiver stores messages included in a received data stream under one or more topics and delivers messages in response to requests from one or more subscribers. As illustrated in FIG. 5B, receiver 552A and receiver 552B are two receivers included in receiver group 350A (shown in FIG. 5A). Data stream 362A can be delivered by cloud gateway 340A to receivers 552A and 552B (e.g., by using port mirroring). In some examples, each of the receivers 552A and 552B can be categorized into one or more topics. A topic is a category or feed name to which messages are stored and published. Messages are, for example, binary arrays that can store any object in any format. In some examples, each topic in a receiver is further divided into a number of partitions, which store messages in a sequence. For example, receiver 552A in FIG. 5B can be categorized to (e.g., subscribers 348A-N) a topic 556A and a topic 556B. Topic 556A can be further divided into partitions 562A-N, each of which stores messages in a sequence. In some examples, the sequence in a particular partition is unchangeable.

As further illustrated in FIG. 5B, a same data stream 362A (or a copy of it) can be delivered from cloud gateway 340A to receiver 552B, which is categorized to include a topic 556C. In some examples, cloud gateway 340A can deliver a same data stream (e.g., data stream 362A) to multiple receivers (e.g., receivers 552A and 552B) using port mirroring. With reference to back to FIG. 3B, in some embodiments, multiple receivers in receiver groups 350A-N can be instantiated by cloud service stream manager 354. Cloud service stream manager 354 can be a system or component separate from cloud gateways 340 or integrated with cloud gateways 340. In some examples, cloud service stream manager 354 determines the topics and partitions associated with each receiver in receiver groups 350A-N and instantiates the receivers accordingly. Such determination can be based on configurations such as subscribed topics stored in cloud configuration resources 358. As an example, cloud service stream manager 354 can determine the subscribed topics based on known subscribers 348A-N. A subscriber can be an application or cloud computing service provider that consumes data (e.g., messages) for any purposes. For example a subscriber can be a cloud-based application that perform analysis on the subscribed data to provide optimization suggestions to the client. A subscriber can also be a software-as-a-service application that performs a task requested by the client. Thus, with the knowledge of subscribers and their subscribed topics, cloud service stream manager 354 can determine the corresponding topics/partitions in receiver groups 350A-N and the number of the receivers required. Cloud service stream manager 354 can thus instantiate the receivers with the appropriate topics and partitions.

With reference to FIG. 5B, in some examples, topics 556A-C associated with receivers 552A-B can be different topics that are subscribed by different subscribers. For example, subscriber 348A can be subscribed to topic 556A; subscriber 348B can be subscribed to both topics 556A and 556B; and subscriber 348N can be subscribed to topic 556C. As a result, different output data streams 366A-N can be delivered to different subscribers 348A-N. As illustrated by FIG. 5B, messages associated with topics 556A-C can be published by receivers 552A and 552B. Subscriber 348A can request (e.g., synchronously or asynchronously) to obtain messages associated with topic 566A. In response to the request, receiver 552A can generate and deliver an output data stream 366A, which includes a plurality of messages of topic 556A (e.g., in one or more partitions 562A-N), to subscriber 348A. Likewise, in response to a request from subscriber 348B, receiver 552A can generate and deliver output streams 366B and 366C, corresponding to topics 556A and 556B respectively, to subscriber 348B. Similarly, in response to a request from subscriber 348C, receiver 552B can generate and deliver an output data stream 366N, which include a plurality of messages of topic 556C, to subscriber 348N.

As described above, receivers 552A and 552B are publish-subscribe type receivers and therefore, messages in data streams routed by cloud gateway 340A are delivered to the subscribers 348A-N in response to the subscribers' requests. As a result, the messages may not be delivered in real time or substantially real time, depending on the frequencies subscribers request for data. In some embodiments, with reference back to FIG. 3B, cloud gateways 340 can deliver data streams in a substantially real time manner. For example, cloud gateways 340 can route data streams 364 to one or more service agents 352A-N (collectively as service agents 352) as the data streams are received by cloud gateways 340. In some examples, cloud gateways 340 route data streams 364 to service agents 352 without waiting for requests for data from service agents 352. As a result, cloud gateways 340 can deliver data streams 362 with a low added latency. This enables data delivery in a substantially real time manner.

With reference to FIG. 3B, in some embodiments, cloud gateways 340 can route or deliver multiple data streams to multiple destinations (e.g., receivers or service agents) in a predetermined order. As one example, the data streams can be routed or delivered based on the order they are received at the cloud gateways 340. For instance, if cloud gateways 340 receives data streams 362 before data streams 364, cloud gateways 340 can correspondingly route data streams 362 to receiver groups 350 before routing data streams 364 to service agents 352.

As another example, multiple data streams can be routed or delivered in accordance with a predefined order determined based on priorities associated with one or more subscribers. For instance, with reference to FIG. 3B, service agents 352 may include one or more applications that consume time-sensitive data and thus may have a higher priority than subscribers 348A-N, which may pull data from receiver group 350A-N as needed. As a result, cloud gateways 340 can deliver data streams 364 before delivering data stream 362, or deliver messages of data streams 364 as a priority over messages of data streams 362 (e.g., delivering messages of data streams 364 as they are received while delaying the delivery of messages of data streams 362 because they are less time sensitive).

As another example, multiple data streams can be routed or delivered dynamically based on one or more network-related conditions. For example, with reference back to FIG. 3B, depending on availability of certain receivers or service agents, or depending on bandwidth availability, the routing or delivering of data streams 362 and 364 can be prioritized dynamically to optimize or improve overall operational efficiency.

With reference to FIG. 3B, in some embodiments, cloud-services computing environment 220 includes one or more services such as pipeline service 344, provisioning service 346, inventory service 368, or the like. Pipeline service 344 is a service that facilitates processing and movement of data (e.g., messages in data streams) between different components of cloud-services computing environment (e.g., between persisting storage 370 and other services, or between services). Provisioning service 346 is a service that facilitates allocation of cloud-based resources and services to one or more systems in one or more client computing environments (e.g., the systems in client computing environment 210). Inventory service 368 collects inventory information such as information about the networks, storage, and virtual machines resources. In some examples, one or more services (e.g., 344, 346, and 368) can transmit commands to cloud gateways 340. For instance, provisioning service 346 can push commands to resources manager 356, which then forward the commands to cloud gateways 340. Cloud gateways 340 can further deliver the commands to systems in client computing environment 210 via a secured connection. The details of the processing and forwarding the commands by cloud gateways 340 are described in co-pending U.S. patent application Ser. No. 16/047,755, now U.S. Pat. No. 11,190,614, entitled "BIDIRECTIONAL COMMAND PROTOCOL VIA A UNIDIRECTIONAL COMMUNICATION CONNECTION FOR RELIABLE DISTRIBUTION OF TASKS," filed on Jul. 27, 2018, the content of which is incorporated by reference for all purposes.

Figure 6A:
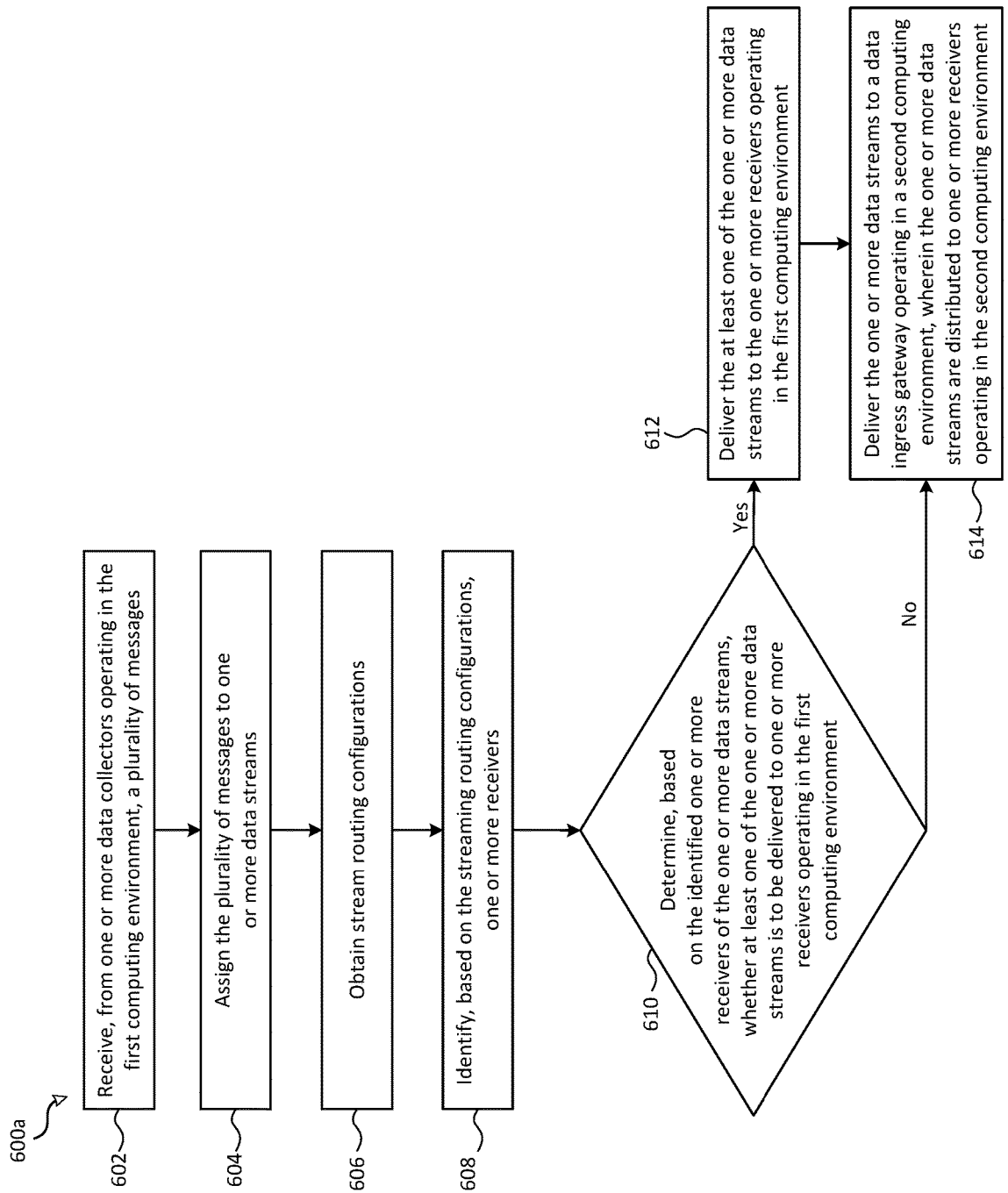

FIGS. 6A-6B illustrate flowcharts of exemplary processes 600a-b for ingesting data streams to a distributed-computing system using a multi-directional data ingestion pipeline, in accordance with some embodiments. Process 600a is performed, for example, using a client gateway operating in a first computing environment having one or more processors and memory (e.g., client gateway 332 operating in client computing environment 210 described in reference to FIG. 3A). Process 600b is performed, for example, using a data ingress gateway operating in a second computing environment having one or more processors and memory (e.g., cloud gateways 340 operating in cloud computing environment 220 described in reference to FIG. 3B). In some embodiments, the distributed-computing system comprises a plurality of host computing devices (e.g., host computing device 100 described in reference to FIG. 1A) that are communicatively coupled together in a network. In some embodiments, the distributed-computing system is implemented by one or more virtual machines (e.g., VM 102 described in reference to FIGS. 1A-1B). The distributed-computing system implements, for example, tenant systems, data sources, network virtualization and security platforms, data collectors, a forwarder, a client gateway, and/or a persisting storage (e.g., corresponding systems and components described in FIG. 3A). The distributed-computing system also implements, for example, cloud gateways, a cloud service manager, a resources manager, receiver groups, service agents, and various cloud services (e.g., corresponding systems and components described in FIG. 3B). In some embodiments, the operations of processes 600a-b are distributed across the various components (e.g., gateways) of the distributed-computing system. In processes 600a-b, some blocks are, optionally, combined, the order of some blocks is, optionally, changed, and some blocks are, optionally, omitted. In some embodiments, additional operations may be performed in combination with processes 600a-b.

At block 602, a plurality of messages is received at the client gateway from one or more data collectors operating in the first computing environment (e.g., data collectors 332 operating in client computing environment 210 described with reference to FIG. 3A).

At block 604, the plurality of messages is assigned to one or more data streams (e.g., data streams 212 described with reference to FIG. 3A).

At block 606, stream routing configurations (e.g., routing tables) are obtained by the client gateway (e.g., client gateway 332 described with reference to FIG. 3A) from client configuration resources (e.g., client configuration resources 334 described with reference to FIG. 3A).

At block 608, one or more receivers (e.g., data collector 372 and service agents 404 described with reference to FIG. 4) are identified based on the streaming routing configurations.

At block 610, whether at least one of the one or more data streams is to be delivered to one or more receivers operating in the first computing environment is determined based on the identified one or more receivers of the one or more data streams.

At block 612, if it is determined that at least one of the one or more data streams is to be delivered to one or more receivers operating in the first computing environment, the at least one of the one or more data streams (e.g., data streams 338A-B) are delivered to the one or more receivers operating in the first computing environment.

At block 614, the one or more data streams (e.g., data streams 212) are delivered to a data ingress gateway operating in a second computing environment (e.g., cloud gateways 340 operating in cloud-services computing environment 220). The one or more data streams are distributed to one or more receivers operating in the second computing environment.

FIG. 6B illustrates a flowchart of exemplary process 600b for stream processing of one or more data streams ingested from a client gateway using a multi-directional data ingestion pipeline. Process 600b can be performed at a data ingress gateway operating in a second computing environment having one or more processors and memory (e.g., cloud gateways 340 operating in cloud-services computing environment 220).

At block 622, a first data stream (e.g., data stream 362A described with reference to FIG. 5A) ingested from a client gateway operating in a first computing environment different from the second computing environment is received.

At block 624, based on the first data stream and receiver registration information, a first delivery policy associated with a first receiver group (e.g., receiver group 350A described with reference to FIG. 5A) including one or more receivers is obtained.

At block 626, a second data stream (e.g., data stream 362B described with reference to FIG. 5A) ingested from the client gateway is received. The second data stream is different from the first data stream.

At block 628, based on the second data stream and the receiver registration information, a second delivery policy associated with a second receiver group (e.g., receiver group 350B described with reference to FIG. 5A) including one or more receivers is obtained. The second delivery policy is different from the first delivery policy.

At block 630, the first data stream is delivered to the first receiver group in accordance with the first delivery policy.

At block 632, the second data stream is delivered to the second receiver group in accordance with the second delivery policy.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method for ingesting data streams to a distributed-computing system using a multi-directional data ingestion pipeline, the method comprising:
    at a client gateway operating in a first computing environment and in electronic communication with a second computing environment, the client gateway having one or more processors and memory, the memory storing stream routing configurations for routing data streams to receivers of both the first computing environment and the second computing environment:
        receiving, from one or more data collectors operating in the first computing environment, a plurality of messages generated by one or more systems operating in the first computing environment;
        assigning the plurality of messages to one or more of the data streams;
        obtaining the stream routing configurations from the memory;
        identifying, based on the obtained stream routing configurations, one or more of the receivers;
        determining, based on the identified one or more receivers of the one or more data streams, whether at least one of the one or more data streams is to be delivered to one or more receivers operating in the first computing environment;
        in accordance with a determination that at least one of the one or more data streams is to be delivered to one or more receivers operating in the first computing environment, delivering the at least one of the one or more data streams to the one or more receivers operating in the first computing environment; and
        delivering the one or more data streams to a forwarder operating within the first computing environment that is configured to redact the one or more data streams prior to forwarding the one or more data streams to a data ingress gateway operating in the second computing environment, wherein the one or more data streams are distributed to one or more receivers operating in the second computing environment;
    wherein the first computing environment is a private network associated with a client of the distributed-computing system and the second computing environment is a network associated with a service provider that provides data services to the client, the private network associated with the client and the network associated with the service provider being separate networks.

2. The method of claim 1, wherein assigning the plurality of messages to one or more data streams comprises:
    obtaining, based on information included in the plurality of messages, identifications of the one or more data collectors;
    identifying, based on the identifications of the one or more data collectors and predetermined collector-stream associations, the one or more data streams; and
    assigning each message of the plurality of messages to a corresponding data stream of the identified one or more data streams.

3. The method of claim 1, wherein the one or more receivers operating in the first computing environment include at least one of:
    the one or more data collectors operating in the first computing environment; and
    one or more service agents operating in the first computing environment, wherein the service agents communicate with one or more computing environments different from the second computing environment.

4. The method of claim 3, wherein delivering the at least one of the one or more data streams to the one or more receivers operating in the first computing environment comprises: delivering the at least one of the one or more data streams to one or more collectors or service agents operating in the first computing environment.

5. The method of claim 1, wherein the plurality of messages comprises log messages, application data and inventory information.

6. The method of claim 1, wherein the one or more data collectors are processing pipelines configured to process the plurality of messages by extracting payloads, annotating payloads and/or categorizing payloads of the plurality of messages prior to sending the plurality of messages to the client gateway.

7. The method of claim 1, further comprising:
    establishing a persistent connection between the client gateway and the data ingress gateway, wherein the one or more data streams are delivered to the data ingress gateway via the persistent connection.

8. A non-transitory computer-readable storage medium storing one or more programs configured to be executed by a client gateway operating in a first computing environment and in electronic communication with a second computing environment, the client gateway having one or more processors and memory storing stream routing configurations for routing data streams to receivers of both the first computing environment and the second computing environment, the one or more programs including instructions for:
    processing a plurality of messages received from one or more data collectors operating in the first computing environment and generated by one or more systems operating in the first computing environment;
    assigning the plurality of messages to one or more of the data streams;
    obtaining the stream routing configurations from the memory;
    identifying, based on the obtained stream routing configurations, one or more of the receivers;
    determining, based on the identified one or more receivers of the one or more data streams, whether at least one of the one or more data streams is to be delivered to one or more receivers operating in the first computing environment;
    in accordance with a determination that at least one of the one or more data streams is to be delivered to one or more receivers operating in the first computing environment, delivering the at least one of the one or more data streams to the one or more receivers operating in the first computing environment; and
    delivering the one or more data streams to a forwarder operating within the first computing environment that is configured to redact the one or more data streams prior to forwarding the one or more data streams to a data ingress gateway operating in the second computing environment, wherein the one or more data streams are distributed to one or more receivers operating in the second computing environment;

wherein the first computing environment is a private network associated with a client of a distributed-computing system and the second computing environment is a network associated with a service provider that provides data services to the client, the private network associated with the client and the network associated with the service provider being separate networks.

9. A system for stream processing of one or more data streams ingested from a client gateway using a multi-directional data ingestion pipeline, the system comprising:

a client gateway operating in a first computing environment and in electronic communication with a second computing environment, the client gateway having one or more processors and memory storing stream routing configurations for routing data streams to receivers of both the first computing environment and the second computing environment, and one or more programs configured to be executed by the one or more processors, the one or more programs including instructions for, at the client gateway:

receiving a plurality of messages from one or more data collectors operating in the first computing environment and generated by one or more systems operating in the first computing environment;

assigning the plurality of messages to one or more of the data streams;

obtaining the stream routing configurations from the memory;

identifying, based on the obtained stream routing configurations, one or more of the receivers;

determining, based on the identified one or more receivers of the one or more data streams, whether at least one of the one or more data streams is to be delivered to one or more receivers operating in the first computing environment;

in accordance with a determination that at least one of the one or more data streams is to be delivered to one or more receivers operating in the first computing environment, delivering the at least one of the one or more data streams to the one or more receivers operating in the first computing environment; and delivering the one or more data streams to a forwarder operating within the first computing environment that is configured to redact the one or more data streams prior to forwarding the one or more data streams to a data ingress gateway operating in the second computing environment, wherein the one or more data streams are distributed to one or more receivers operating in the second computing environment;

wherein the first computing environment is a private network associated with a client of a distributed-computing system and the second computing environment is a network associated with a service provider that provides data services to the client, the private network associated with the client and the network associated with the service provider being separate networks.

10. The system of claim 9, wherein the one or more data collectors are processing pipelines configured to process the plurality of messages by extracting payloads, annotating payloads and/or categorizing payloads of the plurality of messages prior to sending the plurality of messages to the client gateway.

11. The system of claim 9, wherein the forwarder is further configured to redact selected ones of the one or more data streams.

* * * * *